No. 896,032. PATENTED AUG. 11, 1908.
W. L. MAAS.
MACHINE FOR SEPARATING COFFEE.
APPLICATION FILED NOV. 12, 1904.

8 SHEETS—SHEET 1.

Witnesses:
E. M. Boesch.
John M. Lynch.

Inventor:
Walter L. Maas,
by: F. N. Bradbury.
Attorneys.

No. 896,032. PATENTED AUG. 11, 1908.
W. L. MAAS.
MACHINE FOR SEPARATING COFFEE.
APPLICATION FILED NOV. 12, 1904.

8 SHEETS—SHEET 2.

Witnesses:
Inventor:
Walter L. Maas.
by Attorney.

No. 896,032. PATENTED AUG. 11, 1908.
W. L. MAAS.
MACHINE FOR SEPARATING COFFEE.
APPLICATION FILED NOV. 12, 1904.

8 SHEETS—SHEET 3.

Witnesses:
E. M. Boesel
John M. Lynch

Inventor:
Walter L. Maas,
by
Attorney.

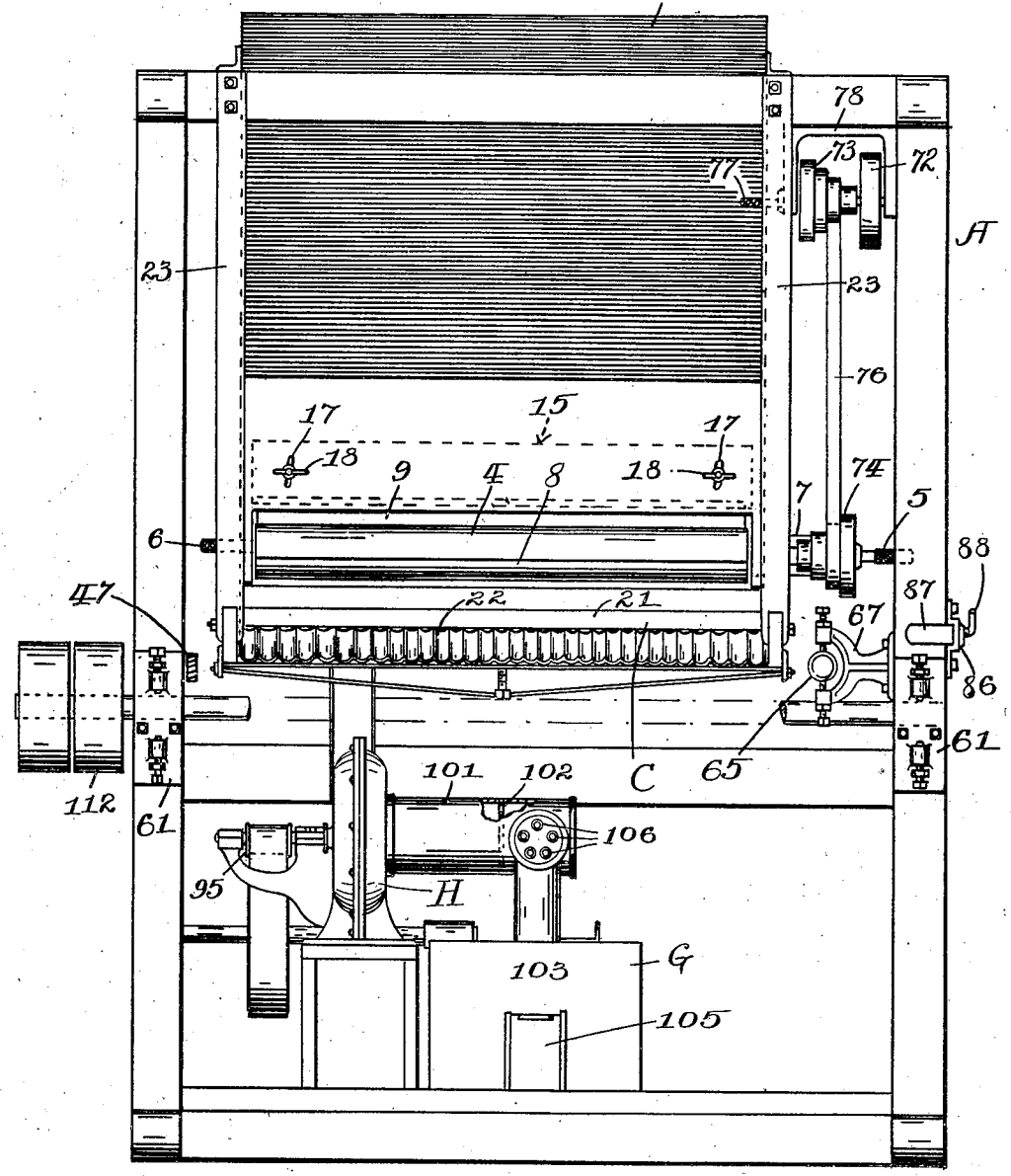

No. 896,032.
PATENTED AUG. 11, 1908.
W. L. MAAS.
MACHINE FOR SEPARATING COFFEE.
APPLICATION FILED NOV. 12, 1904.
8 SHEETS—SHEET 5.
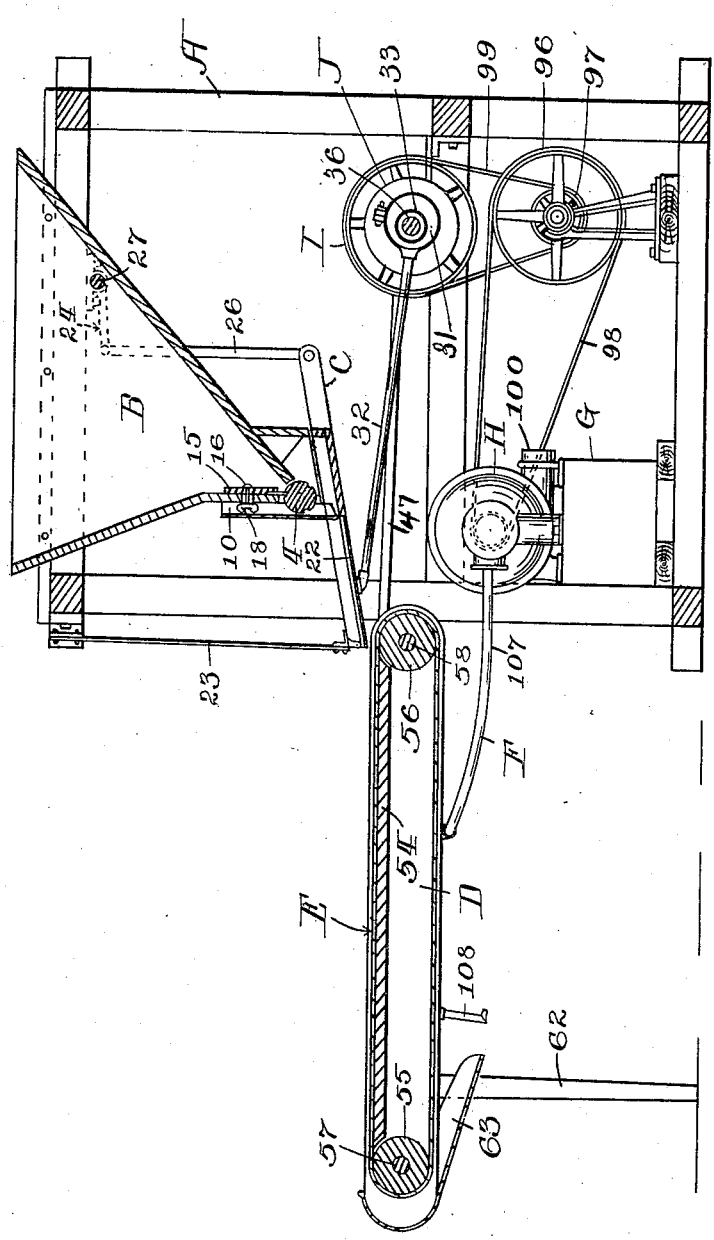

No. 896,032.
PATENTED AUG. 11, 1908.
W. L. MAAS.
MACHINE FOR SEPARATING COFFEE.
APPLICATION FILED NOV. 12, 1904.
8 SHEETS—SHEET 6.
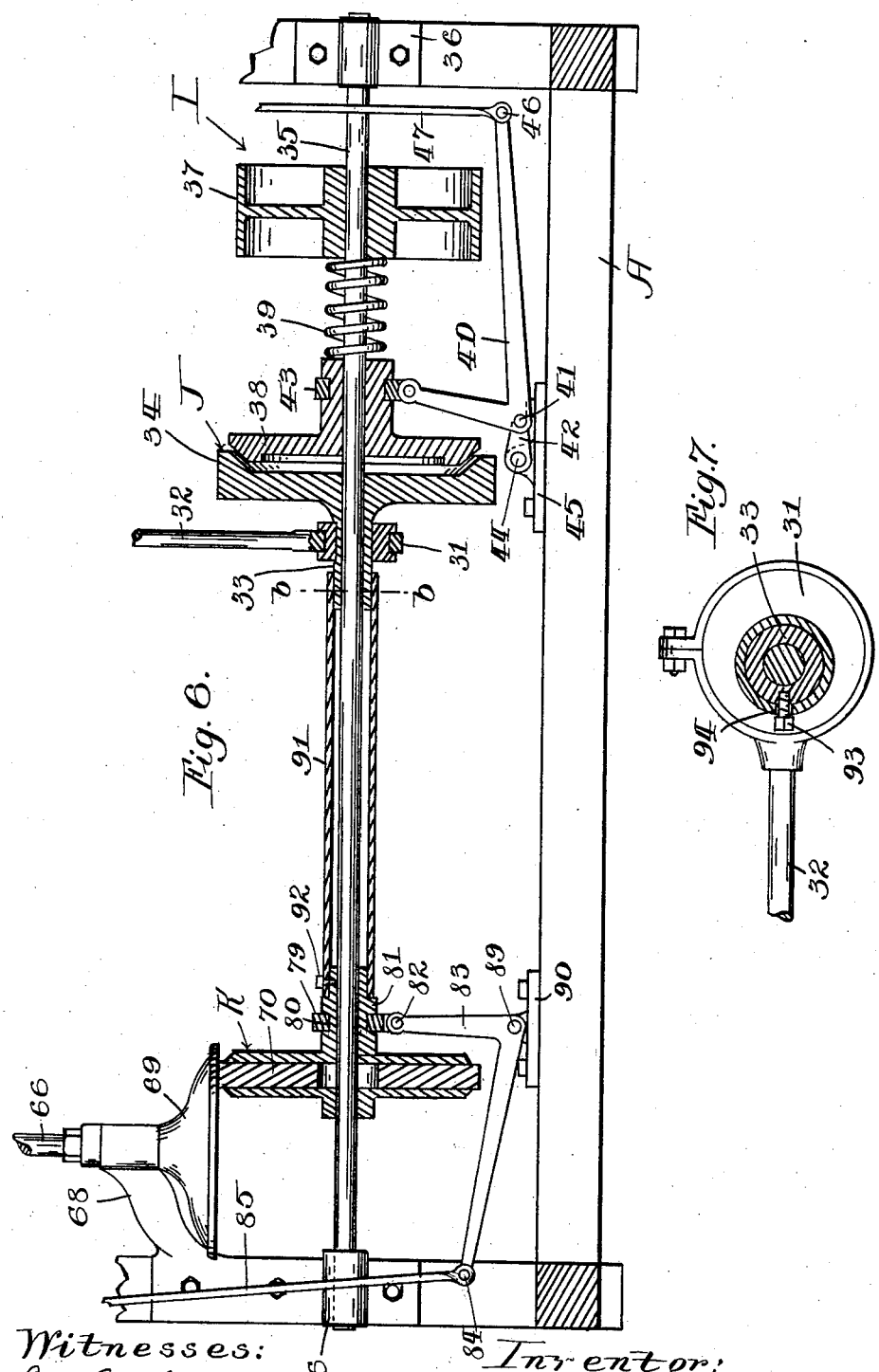
Witnesses:
C. M. Boesel.
John M. Lynch.
Inventor:
Walter L. Maas,
by F. S. Bradbury.
Attorney.

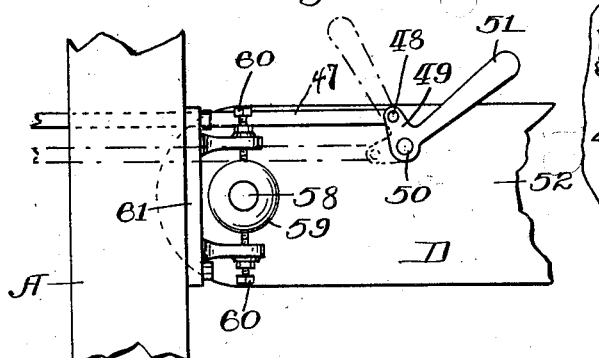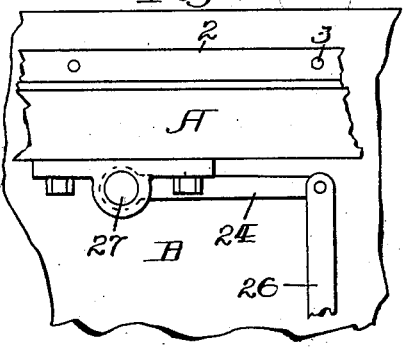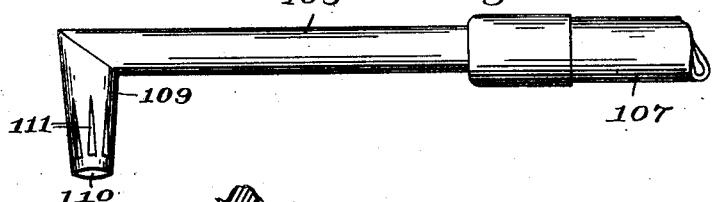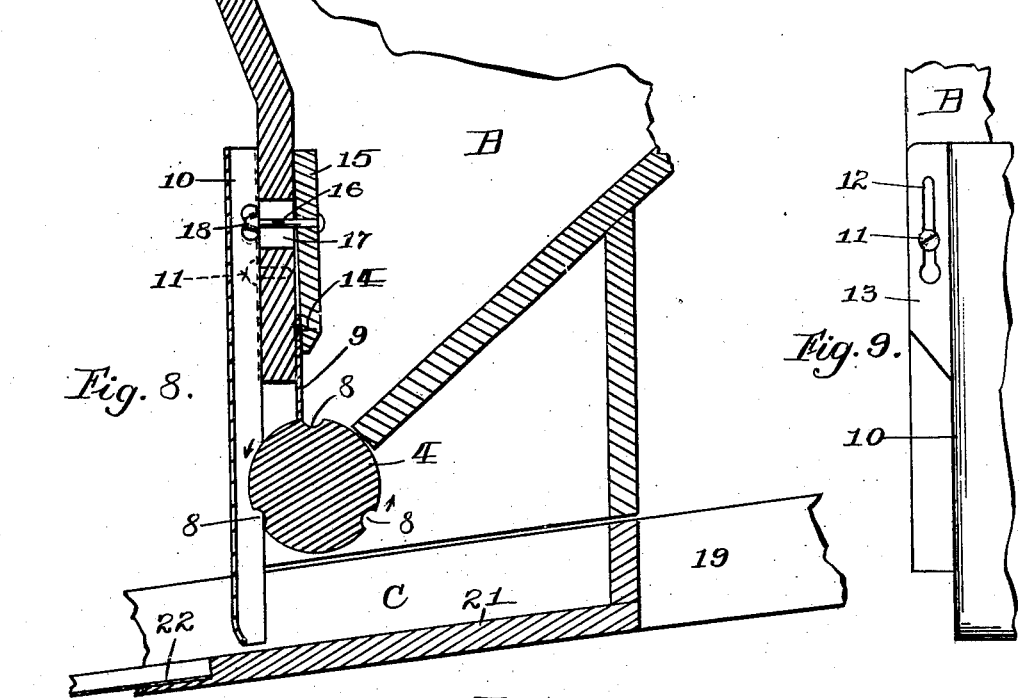

No. 896,032. PATENTED AUG. 11, 1908.
W. L. MAAS.
MACHINE FOR SEPARATING COFFEE.
APPLICATION FILED NOV. 12, 1904.

8 SHEETS—SHEET 8.

Witnesses:
E. M. Boesel.
John L. Lynch

Inventor:
Walter L. Maas,
by: W. G. Bradbury
Attorney.

UNITED STATES PATENT OFFICE.

WALTER L. MAAS, OF ST. PAUL, MINNESOTA.

MACHINE FOR SEPARATING COFFEE.

No. 896,032.　　　　Specification of Letters Patent.　　　　Patented Aug. 11, 1908.

Application filed November 12, 1904. Serial No. 232,399.

*To all whom it may concern:*

Be it known that I, WALTER L. MAAS, a citizen of the United States, residing at St. Paul, in the county of Ramsey and State of Minnesota, have invented a new and useful Machine for Separating Coffee, of which the following is a specification.

My invention relates to improvements in machines for separating coffee and other commodities. Its primary object, as applied to coffee, is to separate what is commonly known as black or imperfect beans in green coffee and the white or imperfect beans (commercially known as Quakers) after the coffee has been roasted. By removing the inferior beans the coffee is improved in quality and increased in value. As applied to other commodities, its object is to separate the imperfect and defective from the perfect. By the use of my invention this operation is performed quicker and with less hand labor and expense.

Further, among the objects of my invention, are to change the speed of the feed mechanism and adjust the parts for separating the imperfect and defective from the perfect in various products.

This invention also contemplates numerous features of construction and combinations of parts hereinafter more particularly described and claimed.

Figure 1:
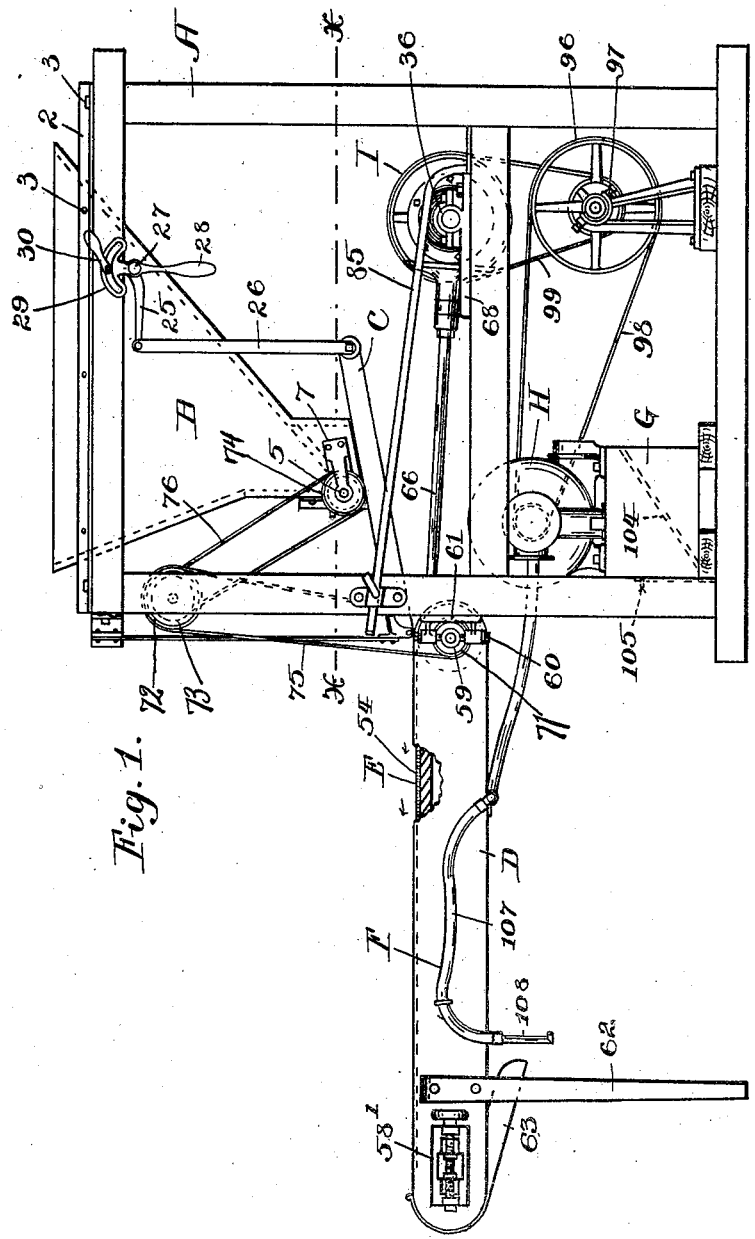
Figure 2:
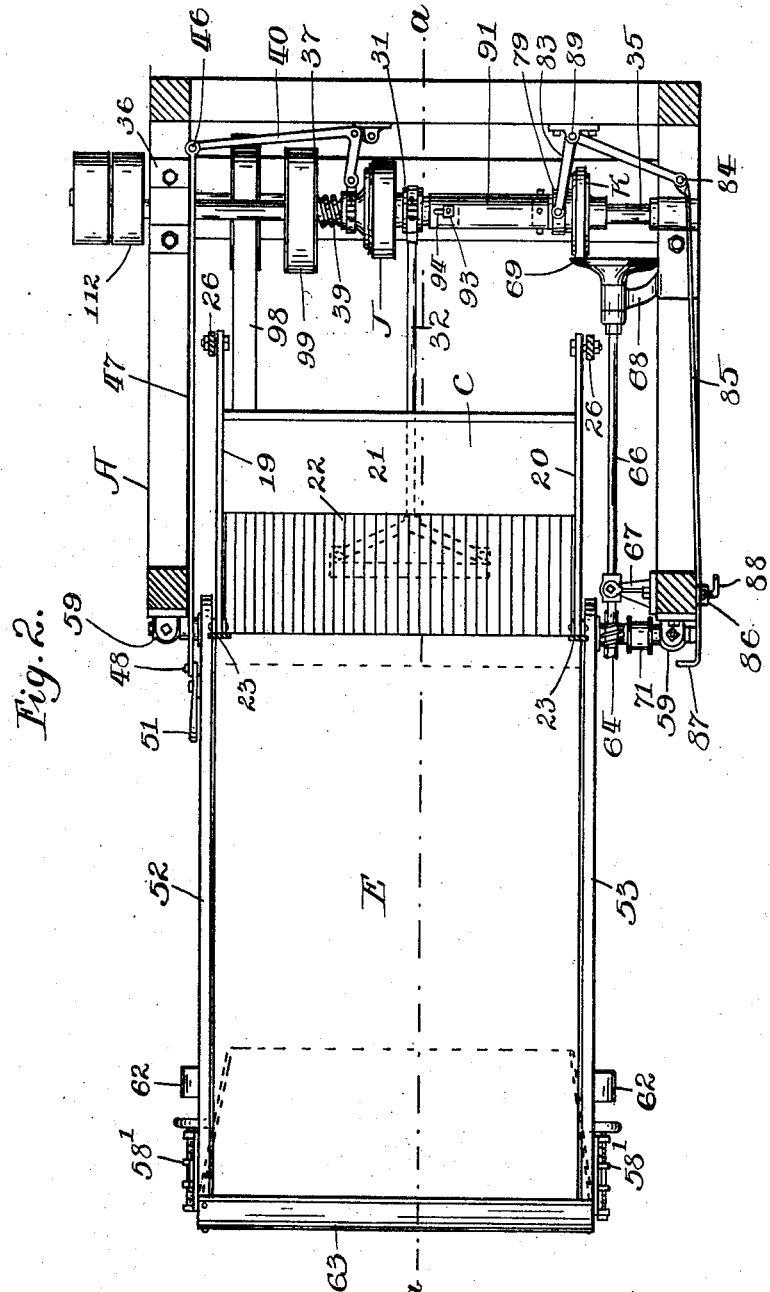
Figure 3:
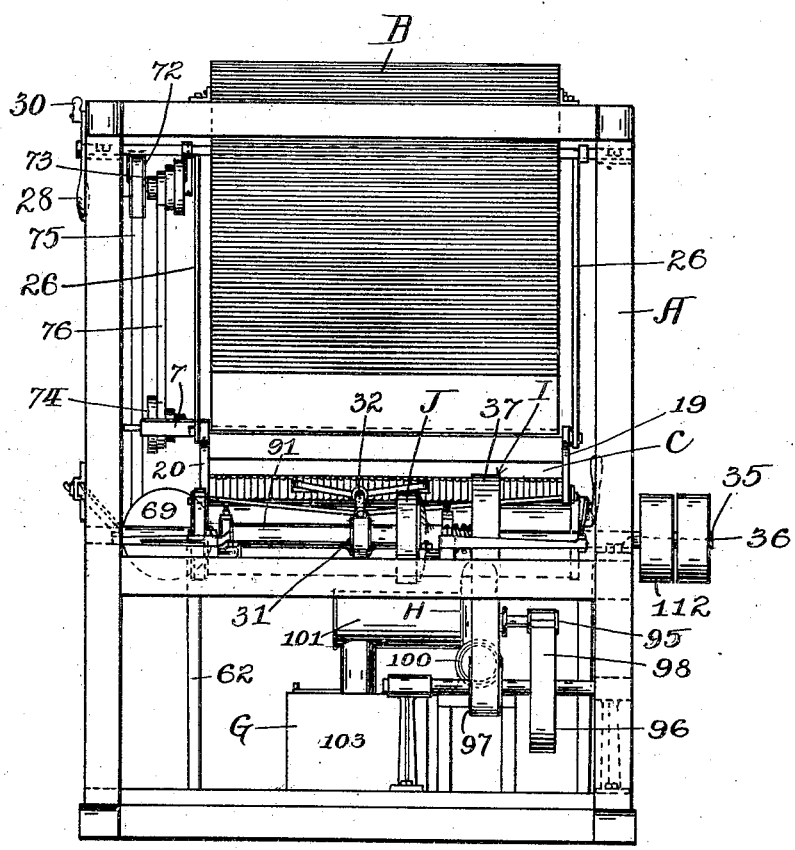
Figure 13:
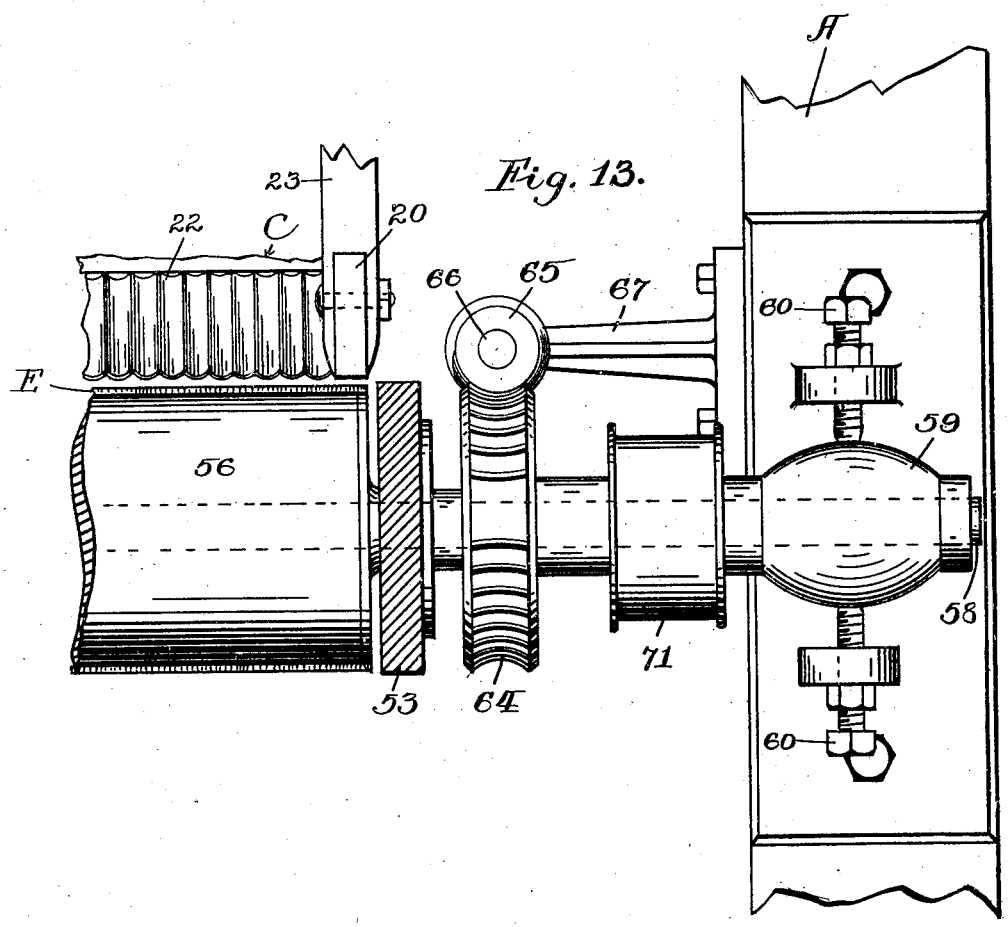

In the accompanying drawings forming part of this specification, Figure 1 is a side view of my invention; Fig. 2 is a sectional plan view, taken on the line X—X, of Fig. 1; Fig. 3 is an end view, looking at the back of the machine; Fig. 4 is an enlarged view, looking at the front of the machine when the table is detached; Fig. 5 is a longitudinal sectional view, taken on the line *a—a*, of Fig. 2; Fig. 6 is an enlarged detail view of part of the drive mechanism; Fig. 7 is a detail sectional view, taken on the line *b—b*, of Fig. 6, showing the eccentric; Fig. 8 is an enlarged detail sectional view, showing part of the feed mechanism; Fig. 9 is a detail view of the guard on the front side of the hopper; Fig. 10 is an enlarged detail view of part of the clutch-operating mechanism; Fig. 11 is a detail view of the hanger for supporting the tray; Fig. 12 is a detail side view of one of the pickers, and Fig. 13 is an enlarged detail view of the drive mechanism.

In the drawings let A represent the frame, B the feed hopper, C the feed tray, D the table, E the apron, on the surface of which coffee from the hopper is fed by said tray, F the suction tubes, G the receiver for the imperfect commodity removed by the suction tubes, H the suction fan and I the actuating mechanism.

The hopper B is mounted upon the frame A by means of the angle irons 2, which are fastened to the sides of the hopper and to the frame by means of the bolts 3. Near the bottom of the hopper a feed roller 4 is mounted upon the end shafts 5 and 6, which are journaled in the sides of the hopper and in the bracket 7.

The feed roller has longitudinal grooves 8 in its perimeter, and a strip 9 of flexible material (such as leather) is suspended to rub lightly over the surface of the feed roller as it revolves in the direction of the arrows indicated in Fig. 8. The coffee or other commodity enters the grooves of the roller, passes the flexible strip which regulates the feed thereof and drops onto the tray C when the roller revolves. A guard 10, vertically adjustable and detachable by means of the screws 11, passing through the slots 12 in the flanges 13, also prevents the coffee from feeding unevenly upon the tray. The flexible strip 9 is tacked, at 14, upon the cross bar 15. This bar is adjusted vertically to regulate the flexible strip by means of the bolts 16 passing through the vertical slots 17 and is set by the thumb nuts 18.

The feed tray C inclines, as shown in Fig. 1, and consists of the side bars 19 and 20, which support a surface plate 21 below the feed roller in the hopper and a corrugated plate 22 adjacent to said surface plate; the corrugations thereof being longitudinally disposed with relation to the movement of the tray and apron. The feed tray is swung from the frame by means of the flexible strips 23 and the arms 24 and 25, which are pivotally connected to the side bars 19 and 20 by the rods 26 and mounted upon the transverse shaft 27, which is journaled upon the frame. The arm 25 is provided with a handle 28, by which the angle of inclination of the tray may be varied, and a slotted segment 29, through which a hand screw 30 passes to set the position of the arms 24 and 25 and hold the tray adjusted. The tray is oscillated by means of an eccentric 31, which is connected by the pitman rod 32 to said tray and carried upon the hub 33 of the driven member 34 of the clutch J. This clutch is mounted upon the drive shaft 35, turning in the boxes 36 on the frame and carrying a pulley 37. Between the hubs of this pulley and that of the drive section 38 of the clutch J is an expansion spring 39, the tendency of which is to press the drive member into engagement with the driven member of said clutch. To throw the clutch out of engagement, a bell crank lever 40 is pivoted between its ends, at 41, upon the link 42. One arm of said lever is pivoted on the collar 43, which is free to turn on the drive member of the clutch. The link 42 is pivoted, at 44, upon the bracket 45, which is fastened upon the frame. The other arm of the lever is pivoted, at 46, to the connecting rod 47, this rod in turn being pivoted, at 48, on the handle 49.

The handle, as shown in Fig. 10, is another bell crank lever, pivoted near its angle, at 50, on the side 52 of the table, and has an arm 51, which forms the hand piece by which it is operated. When the handle assumes the full line position, the clutch members are engaged, the driven member revolved and the tray oscillated, and when in the dotted line position, the clutch members are locked out of engagement, owing to the relative position of the pivot connection 48 and the point on which the handle turns.

The table D has two sides 52 and 53, between which is a top 54, over the surface of which the apron E travels in the direction of the arrows shown in Fig. 1.

The apron E is an endless belt of suitable material (preferably made out of plush), which has a nap or shag upon its surface, for the purpose of preventing round berries from rolling upon its surface when fed from the delivery end of the tray. The apron passes around the rollers 55 and 56. The roller 55 is freely journaled upon the shaft 57, which is carried by the adjusting supports 58' on the sides of the table, for the purpose of alining the apron and causing it to travel directly between the sides of the table. The roller 56 is mounted upon the drive shaft 58, which is journaled in the sides of the table and in the boxes 59, which are placed between set bolts 60, carried by brackets 61 on the frame. By loosening the set bolts 60, the table may be removed when desired. This mode of fastening the parts together forms a convenient construction for separating the machine when moved. The outer end of the table is supported by legs 62 and is provided with a spout 63, in which the coffee drops as the apron revolves.

The shaft 58 carries a worm gear 64, which meshes with the worm 65 on the shaft 66. This shaft is journaled in the brackets 67 and 68 on the frame and carries a friction disk 69 upon its end, against the surfaces of which the drive member 70 of the variable speed mechanism K revolves to move the apron E and revolve the feed roller 4 by means of the pulleys 71, 72, 73 and 74 and the belts 75 and 76. The pulley 71 is mounted on the shaft 58. The pulleys 72 and 73 are mounted on the shaft 77, which passes through the hanger 78 on the frame, and the pulley 74 is mounted upon the removable shaft 5, which is connected with the feed roller. The pulleys 73 and 74 are of step by step form to vary the speed of the feed roller. The drive member of the variable speed mechanism K is mounted freely to slide on the shaft 35 with its working surface in contact with the face of the disk 69. A collar 79, freely mounted in the groove 80 of the hub 81 on the drive member 70, is pivotally attached, at 82, to one arm of the bell crank lever 83. The other arm of the bell crank lever is pivotally attached, at 84, to the shifting rod 85, which passes through the guide 86 on the frame and is formed with a handle 87 by which it may be operated to move the drive member 70 of the variable speed mechanism, to change the speed of operation of the belt and feed roller. A set bolt 88, passing through the guide 86, is adapted to hold the shifting rod 85 and drive member 70 in adjusted position. The bell crank lever 83 is pivoted near its angle, at 89, upon the bracket 90, which is fastened on the frame.

Motion is communicated from the drive shaft 35 to the drive member 70 by means of a sleeve 91, which is fastened to the hub 81 by the bolts 92, and is in sliding connection with the driven member 34 of the clutch by means of the bolt 93 passing freely through the slot 94 in said sleeve (see Fig. 7).

Below the tray is stationed a suction fan H, which has a drive pulley 95 operatively connected to the main drive shaft 35 by means of the intermediate pulleys 96, 97 and 37 and drive belts 98 and 99. The suction fan has an exhaust outlet 100 and an inlet pipe 101, said inlet being provided with a screen 102 to prevent the coffee beans passing into the fan. The inlet pipe 101 is connected with a receiver 103 for receiving the coffee beans which are removed by the suction fan.

The receiver has an inclined bottom 104 and an outlet door 105. A series of openings 106 are formed in the inlet pipe 101, with which a series of flexible suction tubes 107 are connected. Each of these suction tubes is provided with a picking tube 108, fastened upon its end, which is movable at will with the free end of the suction tube to any point of the carrier surface. The mouth piece 109 of the picking tube is arranged at an angle to the body or handle portion of the picker and is reduced in size toward its mouth 110. The mouth piece is provided with a series of slots 111, which gradually taper toward the handle piece to compensate for the reduction in size of the mouth 110 as compared with the cross-sectional area of the suction tube.

It has been found in practice that, without this adjustment, the strength of the suction draft in the tube, to be sufficient to pick up a bean without molesting a closely adjoining bean, must be provided with means of ingress for air besides the mouth of the picker; otherwise more than a single bean is picked at a time when the tube is used. The tapering slots 111 are carefully calculated so that where they are of the greatest width, the tube is of substantially the least diameter, and where the edges of the slots converge together, the picker is of substantially the same diameter as the body portion of the suction tube. The combined cross-sectional area of the openings, taken on a given line of the mouth piece, equals the cross-sectional area of the passageway through the picking tube.

In operation the hopper is filled with coffee to be picked and the drive shaft 35 revolved continuously by means of the drive pulley 112. The clutch J is closed by throwing the handle 51 into the full line position shown in Fig. 10. The suction fan then draws air through the suction tubes, and the tray is oscillated by means of the eccentric 31. The apron E moves in the direction of the arrows shown in Fig. 1, and the coffee is fed from the hopper onto the tray, which subsequently disperses it upon the surface of the apron, all of the beans being separated.

The speed of the feed mechanism may be adjusted by shifting the belt 76 to different steps of the pulleys 73 and 74. The speed of the feed and the apron E are also varied together by shifting the handle 87 and resetting the bolt 88 to change the position of the drive member of the variable speed mechanism. The picking tubes are used to pick the imperfect or inferior beans from the perfect on the surface of the apron, said beans so removed passing into the receiver G, where they may be subsequently removed by opening the door 105.

When it is desired to pick other commodities than coffee, the feed roller may be removed and one having grooves larger or smaller in size substituted and the flexible strip and guard 10 adjusted. A still greater variation of the feed may be obtained for using the machine with other commodities (such as peas) by raising or lowering the handle 28 and changing the angle of inclination of the tray. This last adjustment is also very often desirable, for it causes the coffee to feed onto the apron to correspond with the speed of the feed roller 5 and the apron.

Having described my invention, what I claim as new and desire to protect by Letters Patent, is:—

1. A machine of the class set forth, consisting of a carrier, the surface of which has a nap or shag resembling plush, a hopper, a feed roller near the bottom of said hopper having longitudinal grooves in its perimeter, a flexible strip adapted to sweep above the surface of said roller, a tray having a corrugated surface between said feed roller and carrier, a dirigible, hand-operable suction tube movable at will to any desired part of the carrier surface and having a capacity to pick out only single bodies, a suction fan and receiver connected with said tube, actuating mechanism, a clutch connected with said actuating mechanism, means for differentiating the speed of the carrier, feed roller and tray, and a frame for supporting said parts.

2. A machine of the class set forth, consisting of a carrier belt, a table around which said belt passes, a hopper, a feed roller near the bottom of said hopper having a groove in its perimeter, a flexible strip above said roller, said strip adjustable toward the surface of said roller, a tray inclined from said roller toward the surface of said belt and having a plain surface below said roller and a corrugated surface adjoining said belt, means for varying the angle of inclination of said tray, means for revolving said feed roller, oscillating said tray and moving said belt, and a dirigible, hand-operable suction tube movable at will to any desired part of the surface of said carrier and having a capacity to pick out only single bodies.

3. A machine of the class set forth, consisting of a table, a supporting frame to which said table is detachably fastened, an endless apron passing around said table, a spout at the delivery end of said apron, a hopper on said frame, a feed roller detachably fastened near the bottom of said hopper and having longitudinal grooves in its perimeter, a flexible strip above the surface of said roller, means for adjusting said strip toward said roller, a feed tray swung from said frame and inclined from said feed roller toward the receiving end of said apron and having a plain surface below said roller and a corrugated surface adjoining said apron, means for changing the angle of inclination of said tray, a suction tube having a reduced inlet and a series of openings adjoining said inlet, which are equal in combined area, including said inlet, to the cross-sectional area of the passageway in the body of said tube, a suction fan and receiver connected with said tube, a drive shaft, an eccentric on said drive shaft connected with said tray to oscillate the same, a clutch for throwing said drive shaft into and out of operation, means for locking the operative parts of said clutch engaged and disengaged, a connection between said drive shaft and suction fan, and differential mechanism connected with said drive shaft, apron and feed roller.

In testimony whereof I have signed my name to this specification in the presence of two subscribing witnesses.

WALTER L. MAAS.

Witnesses:
   E. M. BOESEL,
   F. G. BRADBURY.